United States Patent
Wang et al.

(10) Patent No.: US 10,722,942 B2
(45) Date of Patent: Jul. 28, 2020

(54) MULTI-ARM HANGING RAIL TYPE CASTING CLEANING ROBOT

(71) Applicant: Anhui University of Science and Technology, Huainan (CN)

(72) Inventors: Chengjun Wang, Huainan (CN); Rui Yu, Huainan (CN); Yongcun Guo, Huainan (CN); Yuzhe Shen, Huainan (CN); Yan Zheng, Huainan (CN); Zhiwei Zhu, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 262 days.

(21) Appl. No.: 15/779,851

(22) PCT Filed: Oct. 31, 2017

(86) PCT No.: PCT/CN2017/108815
§ 371 (c)(1),
(2) Date: May 30, 2018

(87) PCT Pub. No.: WO2019/015164
PCT Pub. Date: Jan. 24, 2019

(65) Prior Publication Data
US 2019/0366426 A1  Dec. 5, 2019

(30) Foreign Application Priority Data

Jul. 19, 2017 (CN) .......................... 2017 1 0588922

(51) Int. Cl.
| | |
|---|---|
| *B22D 31/00* | (2006.01) |
| *B25J 11/00* | (2006.01) |
| *B25J 5/02* | (2006.01) |
| *B25J 15/06* | (2006.01) |
| *B25J 17/02* | (2006.01) |

(52) U.S. Cl.
CPC .............. *B22D 31/002* (2013.01); *B25J 5/02* (2013.01); *B25J 11/0085* (2013.01); *B25J 15/0608* (2013.01); *B25J 17/0258* (2013.01)

(58) Field of Classification Search
CPC . B22D 31/002; B25J 11/0085; B25J 15/0608; B25J 17/0258; B25J 5/02
(Continued)

(56) References Cited

U.S. PATENT DOCUMENTS

| | | | |
|---|---|---|---|
| 6,073,678 A * | 6/2000 | Garza-Ondarza ...... | B22D 47/00 164/130 |
| 6,871,692 B2 * | 3/2005 | Hamilton ............... | B22D 9/003 164/323 |
| 8,627,740 B2 * | 1/2014 | Skourup .............. | B25J 19/0075 74/490.01 |

FOREIGN PATENT DOCUMENTS

| | | |
|---|---|---|
| CN | 101497199 A | 8/2009 |
| CN | 101279618 B | 8/2010 |

(Continued)

*Primary Examiner* — Jessee R Roe
*Assistant Examiner* — Michael Aboagye
(74) *Attorney, Agent, or Firm* — Bayramoglu Law Offices LLC

(57) ABSTRACT

A multi-arm hanging rail type casting cleaning robot comprises a traveling device, a rotating device, a lifting device, a working arm mounting seat, and four working arms mounted on an annular rail, wherein in addition to pneumatic grippers and magnetic cranes, cleaning tools such as pneumatic air picks and plasma cutters are further provided on end effecters of the working arms. The traveling device of the present invention adopts a four-point hanging supporting mode to realize long-distance stable traveling. Large arm adjusting cylinders and small arm adjusting cylinders are used to replace servo reducing motors to adjust postures of the working arms. The four working arms can jointly and synchronously work. The two pneumatic grippers, the two (Continued)

magnetic cranes, and the four cleaning tools can be flexibly transformed and replaced. The needs of cleaning operations can be satisfied.

10 Claims, 5 Drawing Sheets

(58) Field of Classification Search
USPC .............. 266/77; 74/490.01, 490.02, 490.03, 74/490.05, 490.06; 901/8, 14–16, 23, 25, 901/26, 50
See application file for complete search history.

(56) References Cited

FOREIGN PATENT DOCUMENTS

| | | |
|---|---|---|
| CN | 101391354 B | 12/2010 |
| CN | 104576474 A | 4/2015 |
| CN | 104742111 A | 7/2015 |
| CN | 105108600 A | 12/2015 |
| CN | 105690357 A | 6/2016 |
| CN | 106043480 A | 10/2016 |
| CN | 206047065 U | 3/2017 |
| CN | 107048113 A | 8/2017 |
| CN | 107127734 A | 9/2017 |
| CN | 107150117 A | 9/2017 |
| CN | 105478734 B | 1/2018 |
| CN | 206936349 U | 1/2018 |
| JP | S645778 A | 1/1989 |

* cited by examiner

MULTI-ARM HANGING RAIL TYPE CASTING CLEANING ROBOT

CROSS REFERENCE TO RELATED APPLICATIONS

This application is the national phase entry of International Application No. PCT/CN2017/108815, filed on Oct. 31, 2017, which is based upon and claims priority to Chinese Patent Application No. 201710588922.2, filed on Jul. 19, 2017, the entire contents of which are incorporated herein by reference.

TECHNICAL FIELD

The present invention belongs to the technical field of casting robot equipment, and in particular relates to a multi-arm hanging rail type casting cleaning robot.

BACKGROUND

In casting production processes, castings need to be frequently handled, postures of castings need to be adjusted, and various cleaning operations to castings need to be completed. During production, mold cores and core iron need to be removed, excess metals such as gates, risers, added parts, tie bars, cut bars, flashes and burrs need to be cut off, burnt-on sand and surface foreign matters on castings need to be removed, and casting surfaces need to be ground flat. Up to now, operations to most castings are performed still mainly by means of manual tools and semi-mechanical tools such as pneumatic rammers, pneumatic shovels, high-speed handheld grinding wheels, and suspended grinding wheels. For castings with less complex appearances, universal punching machines and sawing machines are adopted. When castings are produced in a large batch, special machines or special production lines are adopted to realize automatic operations. Steel castings are mostly cut by means of oxygen cutting or gas-electric cutting. Gas-electric cutting refers to a process of using high temperature produced by arc formed between an electrode and a casting to melt or oxidize metals, and simultaneously using a high-pressure and high-speed gas flow to purge molten substances to remove flashes, burrs, and protrusions on castings. This method not only is used for cutting casting heads, but also can be used for flattening casting surfaces. However, gas-electric cutting has the disadvantage that arc light, smoke, and noise are produced.

Burrs, inner gates, and casting head residues on parting surfaces of castings are structures which inevitably exist on castings, all the more so for special-shaped castings, and cleaning and grinding treatment is required. In the past, casting cleaning fully relies on manual operations, the working efficiency is extremely low, the working environment is severe, the labor cost is high, and the labor intensity is great. In a manual casting cleaning process, there are many positions which need to be cleaned for special-shaped castings, the structure is thick and large, the cleaning is quite difficult, and the working efficiency is low; and it is not easy to perform control during manual cleaning, frequently causing the casting quality to be instable; the structure of special-shaped castings is complex, there are many positions which need to be cleaned, workers need to handle the castings endlessly to change angles such that cleaning can be realized; fine dust produced during cleaning is scattered throughout workshops, and consequently the physical health of workers is seriously influenced; and more importantly, the safety of workers cannot be guaranteed.

Handling and posture adjustment of castings are generally performed through manual operations or under the assistance of simple mechanical devices, the degree of human participation is high, the man-hour is greatly consumed, the manufacturing cost is increased, and the manufacturing progress is delayed. Therefore, there is an urgent need to design an automatic device which can simultaneously satisfy the demands of handling, posture adjustment and cleaning operations of castings, and especially satisfy the demands of cleaning operations of heavy-weight, large-size and complex castings, so as to improve the working efficiency of casting cleaning operations and guarantee the quality of casting products.

Aiming at the problems existing in handling and cleaning of castings, current patent literatures also provide some solutions. Chinese patent application No. 200810137471.1 discloses a suspended type pipe-jointing welding robot, which consists of an electrical sliding loop part, a swinging mechanism, a telescoping mechanism, and a manually lifting adjustment mechanism, and realizes automatic welding of differently shaped joint pipes through a rotating mechanism and a telescoping mechanism. However, this technical solution can only realize single-arm type operations and cannot realize multi-arm joint operations. Chinese patent application No. 200710176284 discloses a crawler type multi-arm rod mobile robot, which consists of an arm working device and a crawler walking device, can replace humans to work on various complex pavements. However, the stability is poor when workpieces are grasped, and the operation demands of complex castings cannot be satisfied. Chinese patent application No. 201410438219.X discloses a robot capable of multi-arm handling, which consists of parts such as guide rails and a plurality of individually driven arms, and can simultaneously load and lift cargoes (such as substrates or wafers) which are loaded up and down according to a given pitch unit. However, a single arm is adopted to work alone during handling, and only simple translation and grasping can be performed. Chinese patent application No. 201710121995.3 discloses a suspended type car seat stereoscopic welding robot, wherein a single-arm robot body is suspended on an outer annular rail and an inner annular rail through an outer pulley and an inner pulley and can move and travel along the outer annular rail and the inner annular rail. This solution adopts a two-point suspension fixing manner, which is poor in stability. Chinese patent application No. 201620856209.2 discloses an automatic casting cleaning device, which comprises a robot, a tool magazine, cutters, a rotary worktable, and a controller, and uses a cutter grasped by a power head to clean a casting to be cleaned, wherein the rotary worktable is rotatable such that the casting to be cleaned is located within the cleaning range of the robot. Chinese patent application No. 201510512610.4 discloses a compact type robot automated grinding device, which uses a robot to grasp a casting and move it to a grinding device for grinding. This type of automated grinding device has the following disadvantages: 1) the loading capacity of the robot is limited, and the robot cannot bear too heavy castings; and 2) the feeding movement in the grinding process is the movement of castings, which is not suitable for large-size castings. Chinese patent application No. 201610072103.8 discloses a casting cleaning unit and method, which adopt two robots fixed at different working positions on the ground to grasp a casting to perform cleaning operations such as grinding. However, the working efficiency is low, and the working spaces of the robots are small. With the improvement of casting technical level, the demands of production of large castings, handling, posture adjustment, and cleaning automation of castings are increasingly great. In the existing technical solutions, single-arm robots are mostly adopted to work alone or in combination, and the demands of handling, posture adjustment, and cleaning operations of heavy-weight, large-size, and complex special-shaped castings cannot be satisfied.

SUMMARY

Aiming at the deficiencies of the prior art, the purpose of the present invention is to provide a multi-arm hanging rail type casting cleaning robot having slidable and adjustable working arms, which is a casting robot capable of being used for operations such as recognition, handling, turnover, posture adjustment, sand cleaning, cutting, polishing and grinding of heavy-weight, large-size, and complexly-shaped castings, improving the efficiency and quality of casting cleaning operations, reducing the labor intensity and the production cost, and overcoming the deficiencies of the prior art.

The present invention solves the technical problem by adopting the following technical solutions.

A multi-arm hanging rail type casting cleaning robot comprises a traveling part, an adjustment part, and a multi-arm effecting part, wherein the traveling part comprises a traveling device and an annular rail, and the annular rail comprises an outer annular rail and an inner annular rail; and the traveling device is used for driving the present invention to move and travel along the outer annular rail and the inner annular rail, and the traveling device comprises outer wheel carriers, inner wheel carriers, driving wheels, supporting wheels, tensioning wheels, and hanging brackets. The number of the outer wheel carriers is two, and the two outer wheel carriers are disposed in parallel on the outer annular rail, the outer wheel carriers are connected with the outer annular rail through the driving wheels, the supporting wheels, and the tensioning wheels, and the number of the driving wheels, the number of the supporting wheels, and the number of the tensioning wheels mounted on each outer wheel carrier each are one; two inner wheel carriers are disposed in parallel on the inner annular rail and are connected with the inner annular rail through the supporting wheels and the tensioning wheels, and two supporting wheels and one tensioning wheel are mounted on each inner wheel carrier; the outer diameter and wheel width of the driving wheels are respectively the same as the outer diameter and wheel width of the supporting wheels, axes of the driving wheels and the supporting wheels are located on the same horizontal plane, the driving wheels and the supporting wheels mounted on the outer wheel carriers are located at middle-upper portions of the outer wheel carriers, the two groups of supporting wheels mounted on the inner wheel carriers are located at middle-upper portions of the inner wheel carriers, the tensioning wheels mounted on the outer wheel carriers are located at middle positions of bottoms of the outer wheel carriers, and the tensioning wheels mounted on the inner wheel carriers are located at middle positions of bottoms of the inner wheel carriers; and driving motors are provided in the driving wheels and are used for providing driving power for the traveling of the driving wheels, and the driving motors adopt hydraulic servo motors or pneumatic servo motors or servo reducing motors. Tops of two hanging brackets are respectively connected with the outer wheel carriers and the inner wheel carriers through hinges. Straight line segments of the outer annular rail and the inner annular rail are kept to be parallel and equidistant, arc line segments of the outer annular rail and the inner annular rail are kept to be concentric and equidistant, and the outer annular rail and the inner annular rail are fixedly connected together through connecting plates; the outer annular rail and the inner annular rail are fixedly mounted on a roof of a workshop; and cross sections of the outer annular rail and the inner annular rail all are I-shaped. Axes of four hinges through which the tops of the two hanging brackets are connected with the outer wheel carriers and the inner wheel carriers are mutually in parallel and all are perpendicular to a horizontal plane.

The tensioning wheel comprises a tensioning wheel carrier, a tensioning wheel body, guide shafts, compression springs, and anti-separation blocks, and is used for providing a tensioning force for the traveling device when the present invention moves and travels along the outer annular rail and the inner annular rail, wherein the tensioning wheel body is mounted at a top of the tensioning wheel carrier, a rolling bearing is provided in the tensioning wheel body, and two ends of a rotating shaft of the tensioning wheel body are connected with the tensioning wheel carrier by means of transition fitting; tops of the guide shafts are fixedly connected with the tensioning wheel carrier by means of welding, lower ends of the guide shafts are mounted on the outer wheel carrier or the inner wheel carrier and are connected with the outer wheel carrier or the inner wheel carrier by means of clearance fitting; the compression springs are sleeved on the guide shafts and are located between the tensioning wheel carrier and the outer wheel carrier or the inner wheel carrier for providing a tensioning force for the tensioning wheel; the anti-separation blocks are located at the lower ends of the guide shafts, are fixedly connected with the guide shafts through screws for preventing the guide shafts from being separated from the outer wheel carrier or the inner wheel carrier; and the number of the guide shafts, the number of the compression springs, and the number of the anti-separation blocks each are two.

The adjustment part comprises a rotating device and a lifting device, wherein the rotating device is used for realizing the rotation of the part below the rotating device of the present invention around the axis of the rotating device, and the lifting device is used for realizing the lifting of the present invention in the vertical direction. The rotating device comprises a rotating cylinder, a rotating body, a rotating motor, a driving gear, and an inner gear ring, wherein a top of the rotating cylinder is fixedly mounted at a bottom of the hanging bracket of the traveling device, and a limiting check ring is provided at a bottom of the rotating cylinder; the rotating body is a rotating movement output part of the rotating device, and the rotating body is sleeved in the rotating cylinder and is connected with the rotating cylinder through two thrust bearings and one radial bearing; the rotating motor is fixedly mounted on the rotating cylinder and is used for providing power for the rotating movement of the rotating device, the driving gear is mounted on an output shaft of the rotating motor, and a shaft end check ring is further provided at a tail end of the output shaft of the rotating motor and is fixedly connected with the output shaft of the rotating motor; the inner gear ring is fixedly mounted on an inner side surface of the rotating body through screws and is internally engaged with the driving gear; and the rotating motor adopts a servo reducing motor.

The lifting device comprises a lifting seat, telescopic sleeves, and electric pushrods, wherein the lifting seat is located below the rotating body and is connected with the rotating body through screws, the number of the telescopic sleeves is two, and the two telescopic sleeves are symmetrically disposed below the lifting seat and are connected with the lifting seat through screws; and the number of the electric pushrods is two, and the two electric pushrods are symmetrically disposed below the lifting seat and are connected with the lifting seat through hinges.

The multi-arm effecting part comprises a working arm mounting seat, a first working arm, a second working arm, a third working arm, and a fourth working arm, wherein the working arm mounting seat is located below the lifting device and is used for mounting the first working arm, the second working arm, the third working arm, and the fourth working arm, and the working arm mounting seat is connected with lower ends of the telescopic sleeves and the electric pushrods respectively through screws and hinges. The first working arm, the second working arm, the third working arm, and the fourth working arm each are a five-degree-of-freedom articulated type series manipulator, upper ends of the first working arm, the second working arm, the third working arm, and the fourth working arm all are mounted on the working arm mounting seat, and a kinematic pair of each articulation is a rotating pair. The first working arm and the fourth working arm are fully the same in structure and are symmetrically disposed below the working arm mounting seat, the second working arm and the third working arm are fully the same in structure and are symmetrically disposed below the working arm mounting seat, and the first working arm and the second working arm are fully the same in structure except end effectors; and a top of the first working arm is fixedly connected with the working arm mounting seat, and tops of the second working arm, the third working arm, and the fourth working arm are capable of sliding along the working arm mounting seat. Two symmetrically disposed industrial cameras are provided below the working arm mounting seat and are used for acquiring workshop field images and surface and overall outline information of castings, and the industrial cameras are fixedly mounted below the working arm mounting seat through two-degree-of-freedom holders.

The working arm mounting seat comprises an annular seat body, a first sliding block, a second sliding block, a third sliding block, and a sliding gear ring. A top of the annular seat body is connected with lower ends of the telescopic sleeves and the electric pushrods respectively through screws and hinges, and the top of the first working arm is fixedly mounted on the annular seat body; the first sliding block, the second sliding block, and the third sliding block are sleeved on the annular seat body and are connected with the annular seat body through a top thrust bearing, an outer side radial bearing, and an inner side thrust bearing; and the sliding gear ring is mounted on an inner side surface of the annular seat body and is fixedly connected with the annular seat body. The first sliding block comprises a first sliding block body, a first driving gear, and a first sliding motor, and the first sliding motor is located in the annular seat body and is fixedly mounted on the first sliding block body through screws; and the first driving gear is fixedly mounted on an output shaft of the first sliding motor and is internally engaged with the sliding gear ring. The second sliding block comprises a second sliding block body, a second driving gear, and a second sliding motor, and the second sliding motor is located in the annular seat body and is fixedly mounted on the second sliding block body through screws; the second driving gear is fixedly mounted on an output shaft of the second sliding motor and is internally engaged with the sliding gear ring. The third sliding block comprises a third sliding block body, a third driving gear, and a third sliding motor, and the third sliding motor is located in the annular seat body and is fixedly mounted on the third sliding block body through screws; and the third driving gear is fixedly mounted on an output shaft of the third sliding motor and is internally engaged with the sliding gear ring. The first sliding block body, the second sliding block body, and the third sliding block body are sleeved on the annular seat body, and are connected with the annular seat body through the top thrust bearing, the outer side radial bearing, and the inner side thrust bearing.

The first working arm and the fourth working arm are mainly used for executing casting sand shakeout and sand cleaning operation tasks, and cooperating with other working arms to execute casting handling and posture adjustment operation tasks. The first working arm comprises a first shoulder motor, a first shoulder seat, a first large arm, a first large arm adjusting cylinder, a first small arm, a first small arm adjusting cylinder, a first wrist motor, and a first end effector, wherein the first shoulder motor is fixedly mounted on the annular seat body of the working arm mounting seat, and a first motor mounting seat is provided at a lower end of the first shoulder motor; the first shoulder seat is located below the working arm mounting seat and is connected with an output flange of the first shoulder motor; an upper end of the first large arm is connected with the first shoulder seat through a hinge, and a lower end of the first large arm is connected with an upper end of the first small arm through a hinge; an upper end of the first large arm adjusting cylinder is connected with the first shoulder seat through a hinge, and a lower end of the first large arm adjusting cylinder is connected with a middle-lower portion of the first large arm through a hinge; an upper end of the first wrist motor is fixedly connected with a lower end of the first small arm, an upper end of the first small arm adjusting cylinder is connected with the first large arm through a hinge, and a lower end of the first small arm adjusting cylinder is connected with the first wrist motor through a hinge; and the first end effector is located at a bottommost end of the first working arm, and a top of the first end effector is fixedly connected with an output flange of the first wrist motor. The first end effector comprises a first U-shaped seat, a first wrist swinging motor, a first belt driving device, a first fork bracket, a pneumatic air pick, and a magnetic crane, wherein a top of the first U-shaped seat is fixedly connected with the output flange of the first wrist motor, and the first wrist swinging motor is mounted on the first U-shaped seat; the first fork bracket is mounted at a bottom of the first U-shaped seat and is connected with the first U-shaped seat through a hinge; the first belt driving device is mounted in the first U-shaped seat, and the first wrist swinging motor is connected with the first fork bracket through the first belt driving device; and the pneumatic air pick is fixedly mounted on one side of the first fork bracket, and the magnetic crane is fixedly mounted on the other side of the first fork bracket.

The magnetic crane comprises a magnetic crane seat and electromagnetic suction heads, and is used for adsorbing and fixing a casting and assisting to complete handling and posture adjustment of the casting. The magnetic crane seat is fixedly mounted on a support on one side of the first fork bracket through screws; the number of the electromagnetic suction heads is three, and the three electromagnetic suction heads are triangularly disposed on the magnetic crane seat and all are connected with the magnetic crane seat through spherical hinges; and electromagnets are provided in the electromagnetic suction heads.

The second working arm and the third working arm are mainly used for executing cutting and cleaning operation tasks of excess metals such as pouring systems, tie bars, and added parts on castings, and cooperating with other working arms to execute casting handling and posture adjustment operation tasks. The second working arm comprises a second shoulder motor, a second shoulder seat, a second large arm, a second large arm adjusting cylinder, a second small arm, a second small arm adjusting cylinder, a second wrist motor, and a second end effector, wherein the second shoulder motor is fixedly mounted on the annular seat body of the working arm mounting seat, and a second motor mounting seat is provided at a lower end of the second shoulder motor; the second shoulder seat is located below the working arm mounting seat and is connected with an output flange of the second shoulder motor; an upper end of the second large arm is connected with the second shoulder seat through a hinge, and a lower end of the second large arm is connected with an upper end of the second small arm through a hinge; an upper end of the second large arm adjusting cylinder is connected with the second shoulder seat through a hinge, and a lower end of the second large arm adjusting cylinder is connected with a middle-lower portion of the second large arm through a hinge; an upper end of the second wrist motor is fixedly connected with a lower end of the second small arm, an upper end of the second small arm adjusting cylinder is connected with the second large arm through a hinge, and a lower end of the second small arm adjusting cylinder is connected with the second wrist motor through a hinge; and the second end effector is located at a bottommost end of the second working arm, and a top of the second end effector is fixedly connected with an output flange of the second wrist motor. The second end effector comprises a second U-shaped seat, a second wrist swinging motor, a second belt driving device, a second fork bracket, a plasma cutter, and a pneumatic gripper, wherein a top of the second U-shaped seat is fixedly connected with the output flange of the second wrist motor, and the second wrist swinging motor is mounted on the second U-shaped seat; the second fork bracket is mounted at a bottom of the second U-shaped seat and is connected with the second U-shaped seat through a hinge; the second belt driving device is mounted in the second U-shaped seat, and the second wrist swinging motor is connected with the second fork bracket through the second belt driving device; and the plasma cutter is fixedly mounted on one side of the second fork bracket, and the pneumatic gripper is fixedly mounted on the other side of the second fork bracket.

The first shoulder motor, the second shoulder motor, the first wrist motor, the second wrist motor, the first wrist swinging motor, and the second wrist swinging motor each are a servo reducing motor. The first shoulder motor is fixedly mounted on the annular seat body, the second shoulder motor is fixedly mounted on the first sliding block body of the first sliding block, the third shoulder motor on the third working arm is fixedly mounted on the second sliding block body of the second sliding block, and the fourth shoulder motor on the fourth working arm is fixedly mounted on the third sliding block body of the third sliding block. Axes of the first shoulder motor and the first wrist motor both are perpendicular to an axis of the first wrist swinging motor, and axes of the second shoulder motor and the second wrist motor both are perpendicular to an axis of the second wrist swinging motor. The first belt driving device and the second belt driving device each are a synchronous toothed belt driving device. By replacing the pneumatic air picks and the plasma cutters on the end effectors of the first working arm, the second working arm, the third working arm, and the fourth working arm with tools such as polishing grinders and repair welding guns, operation tasks such as casting cleaning and grinding, polishing, and repair welding can be executed. The first large arm adjusting cylinder, the first small arm adjusting cylinder, the second large arm adjusting cylinder, and the second small arm adjusting cylinder adopt a servo hydraulic cylinder or a servo cylinder or a servo electric cylinder. Ranges of included angles between supports on two sides of the first fork bracket and the second fork bracket each are 60°-100°.

During use, the driving motor in the driving wheel is started according to the working need, so as to drive the traveling device to move and travel on the annular guide rail to a designated operation position, then the rotating device and the lifting device are respectively adjusted according to operation posture and height demands, and the four working arms of the present invention are adjusted to suitable rotating angles and operation heights. Then, the number of the magnetic cranes and the number of the pneumatic grippers needed for handling the casting is determined and selected according the weight and size of the casting. The first sliding motor, the second sliding motor, and the third sliding motor may also be started according to the shape and the size of the casting, so as to adjust the positions of the first shoulder motor, the second shoulder motor, the third shoulder motor, and the fourth shoulder motor on the annular seat body. Posture adjustment of the end effector on each working arm may be realized through the servo reducing motor, the large arm adjusting cylinder, and the small arm adjusting cylinder mounted on each working arm. When a cleaning task is executed, firstly the first wrist motor, the second wrist motor, the third wrist motor on the third working arm, and the fourth wrist motor on the fourth working arm need to be started to adjust the pneumatic air picks, the plasma cutters or other replaced tools such as polishing grinders and repair welding guns to suitable working angles, and then the cleaning operation is performed. The four working arms may also jointly operate, the two pneumatic grippers, the two magnetic cranes, and the four cleaning tools may be flexibly transformed, multi-tool synchronous operation can also be realized, the demands of cleaning operations such as handling, sand cleaning, and cutting of heavy-weight, large-size, and complexly-shaped castings can be satisfied, the efficiency and quality of casting cleaning operations can also be improved, and the labor intensity of operators and the production cost can be reduced.

The present invention has the following beneficial effects: as compared with the prior art, since the traveling device of the present invention adopts a four-point hanging supporting mode, long-distance stable traveling is realized under the condition that the robot is heavily loaded; since the outer wheel carrier, the inner wheel carrier, and the hanging bracket in the traveling device are connected with each other through hinges, the smooth traveling of the driving wheels and the supporting wheels on the outer annular rail and the inner annular rail is facilitated; since the rotating device has an entire-circle rotating function and the lifting device has a height lifting adjustment function, the working space of the robot is obviously expanded; since the large arm adjusting cylinders and the small arm adjusting cylinders are used to replace servo reducing motors to adjust the postures of the working arms, the weight of the working arms is greatly reduced; since there are three working arms which can slide along the annular seat body of the working arm mounting seat to adjust the positions of the working arms on the working arm mounting seat, operation demands of castings with different shapes and sizes can be satisfied; operation tasks such as recognition, handling, turnover, posture adjustment, sand removal, and cutting of castings can be automatically completed, the automation level is high, the working efficiency is high, and the labor intensity is low; and the present invention further has the advantages such as of compact structure, small equipment occupied space, low production cost, high safety, strong flexibility, and simple and convenient operation and maintenance, and can overcome the deficiencies of the prior art.

DETAILED DESCRIPTION OF THE EMBODIMENTS

In order to enable the technical means, innovative features, achieved purposes and effects realized by the present invention to be easy to understand, the present invention will be further described below in combination with the specific embodiments and the drawings.

Figure 1:
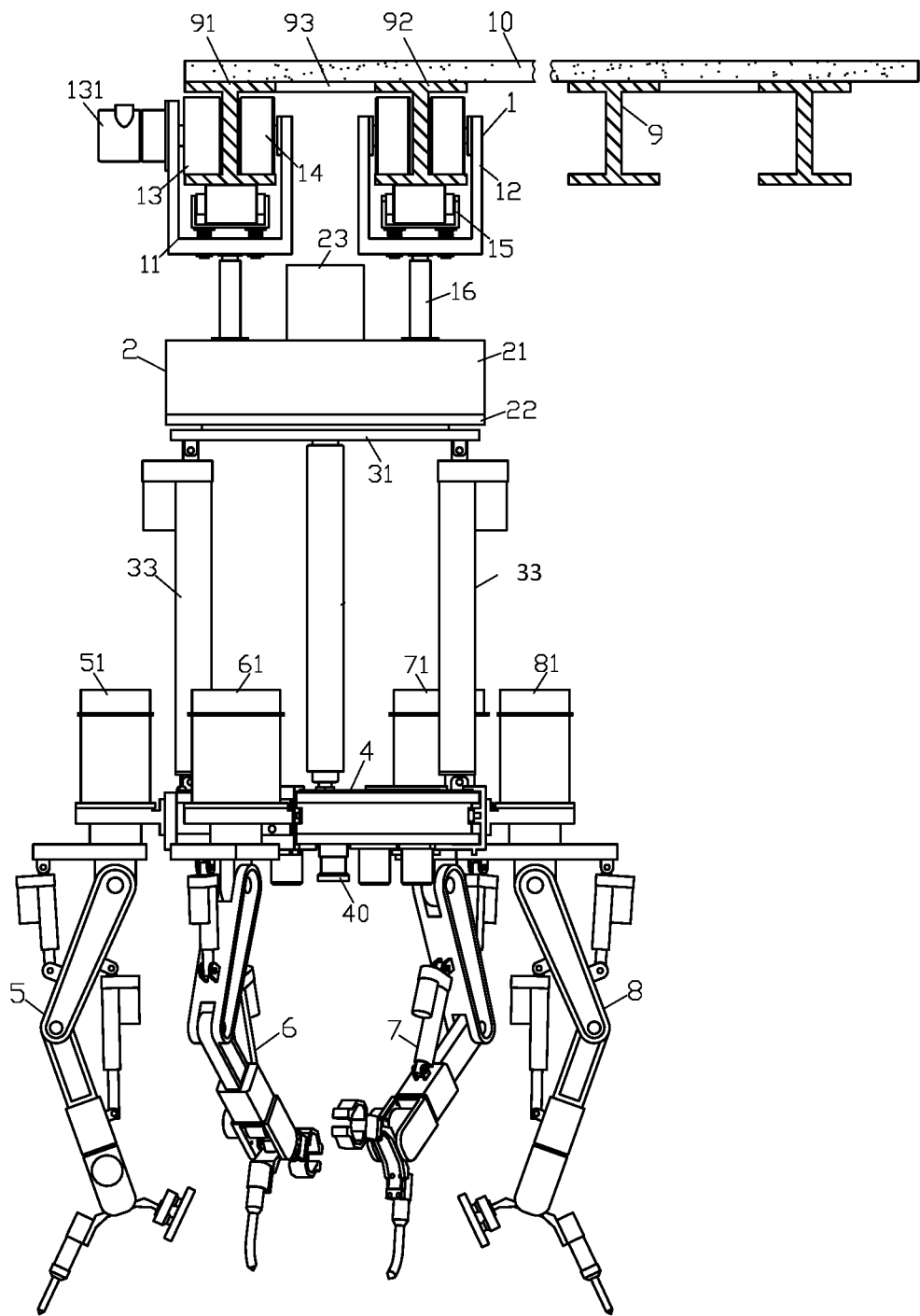
FIG. 1 is an overall structural schematic view of the present invention.
Figure 2:
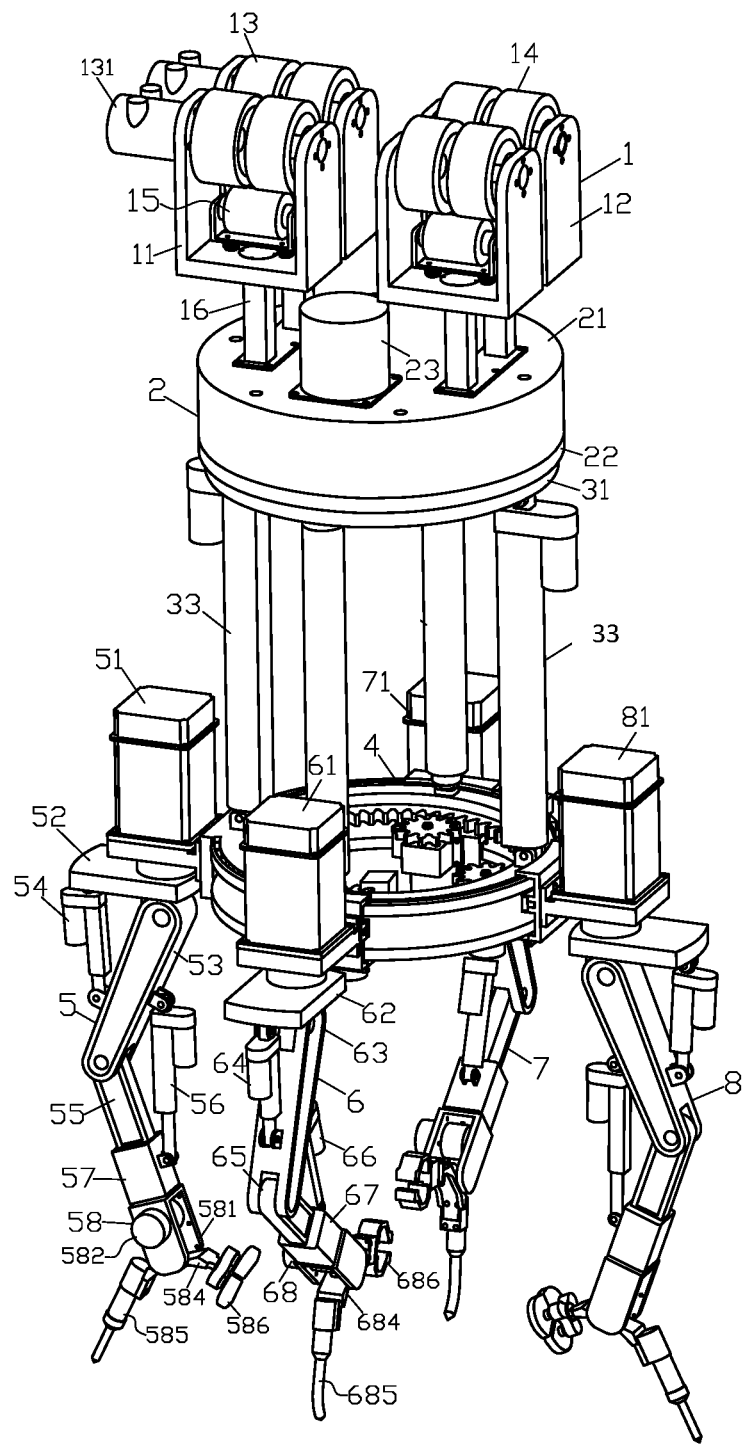
FIG. 2 is a schematic view of a body structure (not containing an outer annular rail and an inner annular rail) of the present invention.
Figure 3:
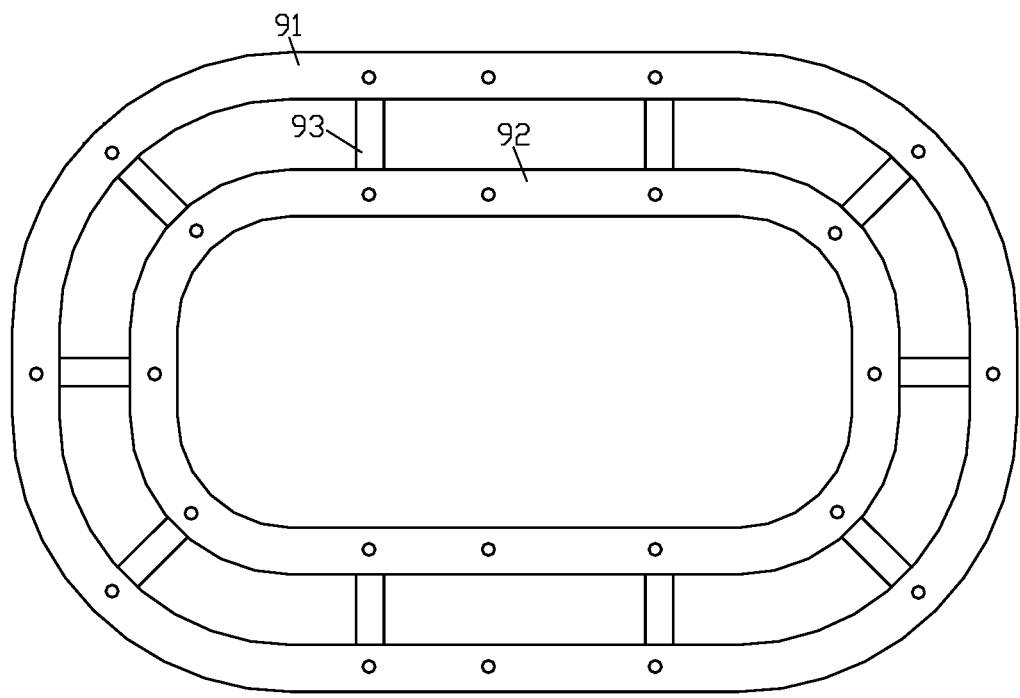
FIG. 3 is a top structural schematic view of an outer annular rail and an inner annular rail of the present invention.

As illustrated in FIG. 1, FIG. 2, and FIG. 3, a multi-arm hanging rail type casting cleaning robot comprises a traveling part, an adjustment part, and a multi-arm effecting part, wherein the traveling part comprises a traveling device 1 and an annular rail 9, and the annular rail 9 comprises an outer annular rail 91 and an inner annular rail 92; the adjustment part comprises a rotating device 2 and a lifting device 3, the rotating device 2 is used for realizing rotation of the part below the rotating device 2 of the present invention around an axis of the rotating device 2, and the lifting device 3 is used for realizing lifting of the present invention in the vertical direction. The traveling device 1 is used for driving the present invention to move and travel along the outer annular rail 91 and the inner annular rail 92, and the traveling device 1 comprises outer wheel carriers 11, inner wheel carriers 12, driving wheels 13, supporting wheels 14, tensioning wheels 15, and hanging brackets 16. The number of the outer wheel carriers 11 is two, and the two outer wheel carriers 11 are disposed in parallel on the outer annular rail 91. The outer wheel carriers 11 are connected with the outer annular rail 91 through the driving wheels 13, the supporting wheels 14, and the tensioning wheels 15, and the number of the driving wheels 13, the number of the supporting wheels 14, and the number of the tensioning wheels 15 mounted on each outer wheel carrier each are one. Two inner wheel carriers 12 are disposed in parallel on the inner annular rail 92 and are connected with the inner annular rail 92 through the supporting wheels 14 and the tensioning wheels 15. Two supporting wheels 14 and one tensioning wheel 15 are mounted on each inner wheel carrier 12. The outer diameter and wheel width of the driving wheels 13 are respectively the same as the outer diameter and wheel width of the supporting wheels 14, and axes of the driving wheels 13 and the supporting wheels 14 are located on the same horizontal plane. The driving wheels 13 and the supporting wheels 14 mounted on the outer wheel carriers 11 are located at middle-upper portions of the outer wheel carriers 11, the two groups of supporting wheels 14 mounted on the inner wheel carriers 12 are located at middle-upper portions of the inner wheel carriers 12, the tensioning wheels 15 mounted on the outer wheel carriers 11 are located at middle positions of bottoms of the outer wheel carriers 11, and the tensioning wheels 15 mounted on the inner wheel carriers 12 are located at middle positions of bottoms of the inner wheel carriers 12. Driving motors 131 are provided in the driving wheels 13 and are used for providing driving power for the traveling of the driving wheels 13, and the driving motors 131 adopt hydraulic servo motors. Tops of two hanging brackets 16 are respectively connected with the outer wheel carriers 11 and the inner wheel carriers 12 through hinges. Straight line segments of the outer annular rail 91 and the inner annular rail 92 are kept to be parallel and equidistant, arc line segments of the outer annular rail 91 and the inner annular rail 92 are kept to be concentric and equidistant, and the outer annular rail 91 and the inner annular rail 92 are fixedly connected together through connecting plates 93. The outer annular rail 91 and the inner annular rail 92 are fixedly mounted on a roof 10 of a workshop. Cross sections of the outer annular rail 91 and the inner annular rail 92 are both I-shaped. Axes of four hinges through which the tops of the two hanging brackets 16 are connected with the outer wheel carriers 11 and the inner wheel carriers 12 are mutually in parallel and all are perpendicular to a horizontal plane.

Figure 6:
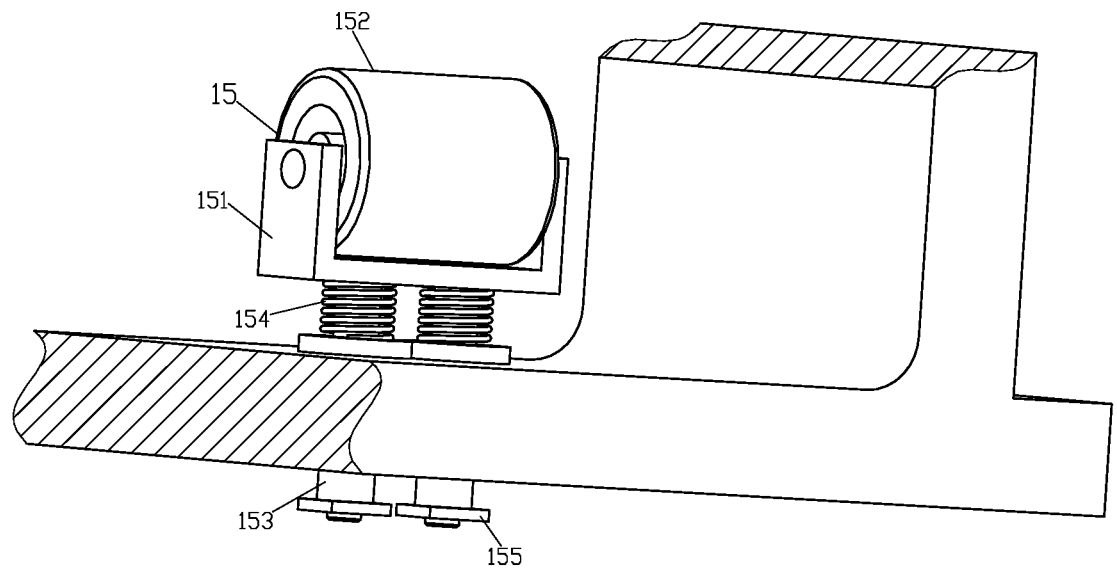
FIG. 6 is a structural schematic view of a tensioning wheel in a traveling device of the present invention.

As illustrated in FIG. 1, FIG. 2, and FIG. 6, the tensioning wheel 15 comprises a tensioning wheel carrier 151, a tensioning wheel body 152, guide shafts 153, compression springs 154, and anti-separation blocks 155, and is used for providing a tensioning force for the traveling device 1 when the present invention moves and travels along the outer annular rail 91 and the inner annular rail 92, wherein the tensioning wheel body 152 is mounted at a top of the tensioning wheel carrier 151, a rolling bearing is provided in the tensioning wheel body 152, and two ends of a rotating shaft of the tensioning wheel body 152 are connected with the tensioning wheel carrier 151 by means of transition fitting; tops of the guide shafts 153 are fixedly connected with the tensioning wheel carrier 151 by means of welding, lower ends of the guide shafts 153 are mounted on the outer wheel carrier 11 or the inner wheel carrier 12 and are connected with the outer wheel carrier 11 or the inner wheel carrier 12 by means of clearance fitting; the compression springs 154 are sleeved on the guide shafts 153, and are located between the tensioning wheel carrier 151 and the outer wheel carrier 11 or the inner wheel carrier 12 for providing a tensioning force for the tensioning wheel 15; the anti-separation blocks 155 are located at the lower ends of the guide shafts 153 and are fixedly connected with the guide shafts 153 through screws for preventing the guide shafts 153 from being separated from the outer wheel carrier 11 or the inner wheel carrier 12; and the number of the guide shafts 153, the number of the compression springs 154, and the number of the anti-separation blocks 155 each are two.

Figure 4:
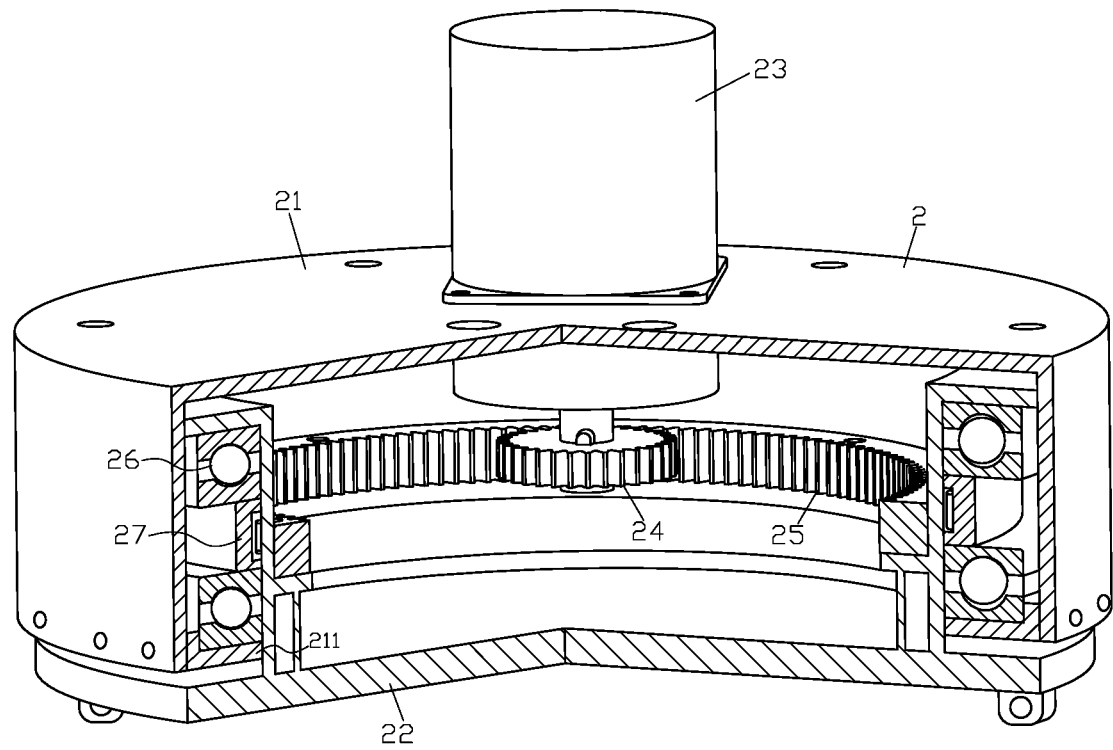
FIG. 4 is a structural schematic view of a rotating device of the present invention.

As illustrated in FIG. 1, FIG. 2, and FIG. 4, the rotating device 2 comprises a rotating cylinder 21, a rotating body 22, a rotating motor 23, a driving gear 24, and an inner gear ring 25, wherein a top of the rotating cylinder 21 is fixedly mounted at a bottom of the hanging bracket 16 of the traveling device 1, a limiting check ring 211 is provided at a bottom of the rotating cylinder 21, and the limiting check ring 211 is connected with the rotating cylinder 21 through screws; the rotating body 22 is a rotating movement output part of the rotating device 2, and the rotating body 22 is sleeved in the rotating cylinder 21 and is connected with the rotating cylinder 21 through two thrust bearings 26 and one radial bearing 27; the rotating motor 23 is fixedly mounted on the rotating cylinder 21 for providing power for the rotating movement of the rotating device 2, the driving gear 24 is mounted on an output shaft of the rotating motor 23, and a shaft end check ring is further provided at a tail end of the output shaft of the rotating motor 23 and is fixedly connected with the output shaft of the rotating motor; the inner gear ring 25 is fixedly mounted on the inner side surface of the rotating body 22 through screws and is internally engaged with the driving gear 24; and the rotating motor 23 adopts a servo reducing motor.

As illustrated in FIG. 1 and FIG. 2, the lifting device 3 comprises a lifting seat 31, telescopic sleeves 32, and electric pushrods 33, wherein the lifting seat 31 is located below the rotating body 22 and is connected with the rotating body 22 through screws, the number of the telescopic sleeves 32 is two, and the two telescopic sleeves 32 are symmetrically disposed below the lifting seat 31 and are connected with the lifting seat 31 through screws; and the number of the electric pushrods 33 is two, and the two electric pushrods 33 are symmetrically disposed below the lifting seat 31 and are connected with the lifting seat 31 through hinges.

As illustrated in FIG. 1, FIG. 2, FIG. 7, and FIG. 8, the multi-arm effecting part comprises a working arm mounting seat 4, a first working arm 5, a second working arm 6, a third working arm 7, and a fourth working arm 8, wherein the working arm mounting seat 4 is located below the lifting device 3 for mounting the first working arm 5, the second working arm 6, the third working arm 7, and the fourth working arm 8, and the working arm mounting seat 4 is connected with lower ends of the telescopic sleeves 32 and the electric pushrods 33 respectively through screws and hinges. The first working arm 5, the second working arm 6, the third working arm 7, and the fourth working arm 8 each are a five-degree-of-freedom articulated type series manipulator, upper ends of the first working arm 5, the second working arm 6, the third working arm 7, and the fourth working arm 8 all are mounted on the working arm mounting seat 4, and a kinematic pair of each articulation is a rotating pair. The first working arm 5 and the fourth working arm 8 are fully the same in structure and are symmetrically disposed below the working arm mounting seat 4, the second working arm 6 and the third working arm 7 are fully the same in structure and are symmetrically disposed below the working arm mounting seat 4. The first working arm 5 and the second working arm 6 are fully the same in structure except end effectors. A top of the first working arm 5 is fixedly connected with the working arm mounting seat 4, and tops of the second working arm 6, the third working arm 7, and the fourth working arm 8 are capable of sliding along the working arm mounting seat 4. Two symmetrically disposed industrial cameras 40 are provided below the working arm mounting seat 4 and are used for acquiring workshop field images and surface and overall outline information of castings, and the industrial cameras 40 are fixedly mounted below the working arm mounting seat 4 through two-degree-of-freedom holders.

Figure 5:
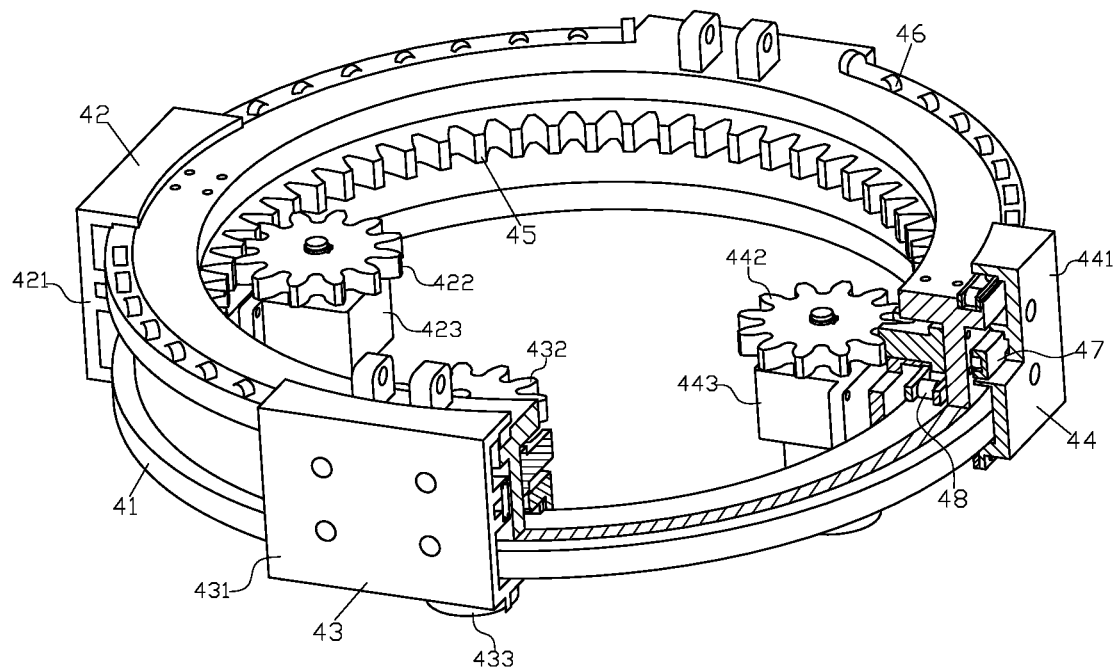
FIG. 5 is a structural schematic view of a working arm mounting seat of the present invention.

As illustrated in FIG. 1, FIG. 2, and FIG. 5, the working arm mounting seat 4 comprises an annular seat body 41, a first sliding block 42, a second sliding block 43, a third sliding block 44, and a sliding gear ring 45. A top of the annular seat body 41 is connected with lower ends of the telescopic sleeves 32 and the electric pushrods 33 respectively through screws and hinges, and the top of the first working arm 5 is fixedly mounted on the annular seat body 41; the first sliding block 42, the second sliding block 43, and the third sliding block 44 are sleeved on the annular seat body 41 and are connected with the annular seat body 41 through a top thrust bearing 46, an outer side radial bearing 47, and an inner side thrust bearing 48; and the sliding gear ring 45 is mounted on an inner side surface of the annular seat body 41 and is fixedly connected with the annular seat body 41. The first sliding block 42 comprises a first sliding block body 421, a first driving gear 422, and a first sliding motor 423, and the first sliding motor 423 is located in the annular seat body 41 and is fixedly mounted on the first sliding block body 421 through screws; and the first driving gear 422 is fixedly mounted on an output shaft of the first sliding motor 423 and is internally engaged with the sliding gear ring 45. The second sliding block 43 comprises a second sliding block body 431, a second driving gear 432, and a second sliding motor 433, and the second sliding motor 433 is located in the annular seat body 41 and is fixedly mounted on the second sliding block body 431 through screws; the second driving gear 432 is fixedly mounted on an output shaft of the second sliding motor 433 and is internally engaged with the sliding gear ring 45. The third sliding block 44 comprises a third sliding block body 441, a third driving gear 442, and a third sliding motor 443, and the third sliding motor 443 is located in the annular seat body 41 and is fixedly mounted on the third sliding block body 441 through screws; and the third driving gear 442 is fixedly mounted on an output shaft of the third sliding motor 423 and is internally engaged with the sliding gear ring 45. The first sliding block body 421, the second sliding block body 431, and the third sliding block body 441 are sleeved on the annular seat body 41, and are connected with the annular seat body 41 through the top thrust bearing 46, the outer side radial bearing 47, and the inner side thrust bearing 48.

Figure 7:
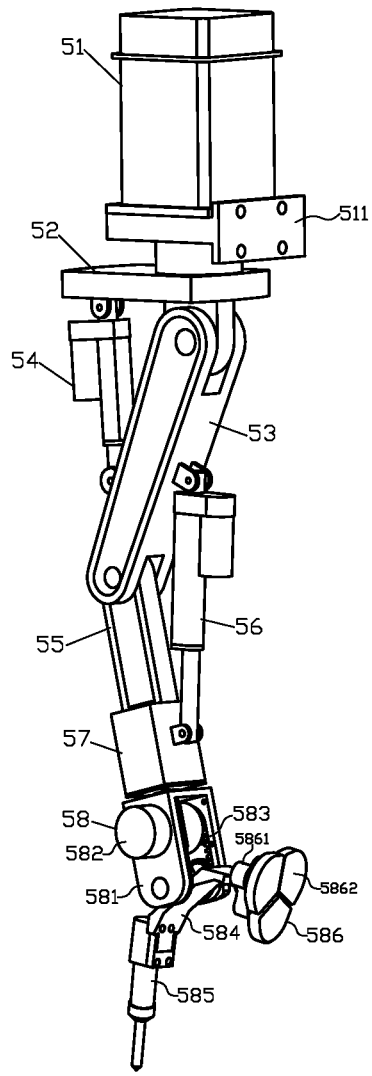
FIG. 7 is a structural schematic view of a first working arm of the present invention.

As illustrated in FIG. 1, FIG. 2, and FIG. 7, the first working arm 5 and the fourth working arm 8 are mainly used for executing casting sand shakeout and sand cleaning operation tasks, and cooperating with other working arms to execute casting handling and posture adjustment operation tasks. The first working arm 5 comprises a first shoulder motor 51, a first shoulder seat 52, a first large arm 53, a first large arm adjusting cylinder 54, a first small arm 55, a first small arm adjusting cylinder 56, a first wrist motor 57, and a first end effector 58, wherein the first shoulder motor 51 is fixedly mounted on the annular seat body 41 of the working arm mounting seat 4, and a first motor mounting seat 511 is provided at a lower end of the first shoulder motor 51; the first shoulder seat 52 is located below the working arm mounting seat 4 and is connected with an output flange of the first shoulder motor 51 through screws; an upper end of the first large arm 53 is connected with the first shoulder seat 52 through a hinge, and a lower end of the first large arm 53 is connected with an upper end of the first small arm 55 through a hinge; an upper end of the first large arm adjusting cylinder 54 is connected with the first shoulder seat 52 through a hinge, and a lower end of the first large arm adjusting cylinder 54 is connected with a middle-lower portion of the first large arm 53 through a hinge; an upper end of the first wrist motor 57 is fixedly connected with a lower end of the first small arm 55, an upper end of the first small arm adjusting cylinder 56 is connected with the first large arm 53 through a hinge, and a lower end of the first small arm adjusting cylinder 56 is connected with the first wrist motor 57 through a hinge; and the first end effector 58 is located at a bottommost end of the first working arm 5, and a top of the first end effector 58 is fixedly connected with an output flange of the first wrist motor 57. The first end effector 58 comprises a first U-shaped seat 581, a first wrist swinging motor 582, a first belt driving device 583, a first fork bracket 584, a pneumatic air pick 585, and a magnetic crane 586, wherein a top of the first U-shaped seat 581 is fixedly connected with the output flange of the first wrist motor 57, and the first wrist swinging motor 582 is fixedly mounted on the first U-shaped seat 581 through screws; the first fork bracket 584 is mounted at a bottom of the first U-shaped seat 581 and is connected with the first U-shaped seat 581 through a hinge; the first belt driving device 583 is mounted in the first U-shaped seat 581, and the first wrist swinging motor 582 is connected with the first fork bracket 584 through the first belt driving device 583; and the pneumatic air pick 585 is fixedly mounted on one side of the first fork bracket 584, and the magnetic crane 586 is fixedly mounted on the other side of the first fork bracket 584.

As illustrated in FIG. 1, FIG. 2, and FIG. 7, the magnetic crane 586 comprises a magnetic crane seat 5861 and electromagnetic suction heads 5862, and is used for adsorbing and fixing a casting and assisting to complete handling and posture adjustment of the casting. The magnetic crane seat 5861 is fixedly mounted on a support on one side of the first fork bracket 584 through screws; the number of the electromagnetic suction heads 5862 is three, and the three electromagnetic suction heads 5862 are triangularly disposed on the magnetic crane seat 5861 and all are connected with the magnetic crane seat 5861 through spherical hinges; and electromagnets are provided in the electromagnetic suction heads 5862.

Figure 8:
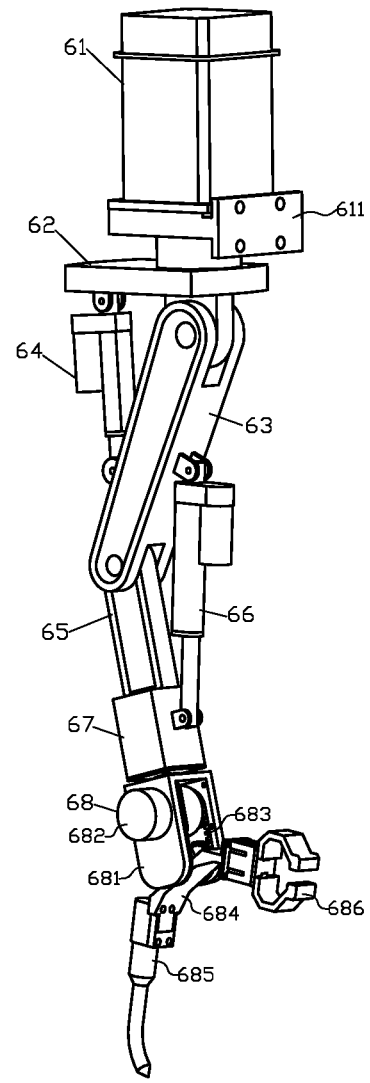
FIG. 8 is a structural schematic view of a second working arm of the present invention.

As illustrated in FIG. 1, FIG. 2, and FIG. 8, the second working arm 6 and the third working arm 7 are mainly used for executing cutting and cleaning operation tasks of excess metals such as pouring systems, tie bars, and added parts on castings, and cooperating with other working arms to execute casting handling and posture adjustment operation tasks. The second working arm 6 comprises a second shoulder motor 61, a second shoulder seat 62, a second large arm 63, a second large arm adjusting cylinder 64, a second small arm 65, a second small arm adjusting cylinder 66, a second wrist motor 67, and a second end effector 68, wherein the second shoulder motor 61 is fixedly mounted on the annular seat body 41 of the working arm mounting seat 4, and a second motor mounting seat 611 is provided at a lower end of the second shoulder motor 61; the second shoulder seat 62 is located below the working arm mounting seat 4 and is connected with an output flange of the second shoulder motor 61; an upper end of the second large arm 63 is connected with the second shoulder seat 62 through a hinge, and a lower end of the second large arm 63 is connected through an upper end of the second small arm 65 through a hinge; an upper end of the second large arm adjusting cylinder 64 is connected with the second shoulder seat 62 through a hinge, and a lower end of the second large arm adjusting cylinder 64 is connected with a middle-lower portion of the second large arm 63 through a hinge; an upper end of the second wrist motor 67 is fixedly connected with a lower end of the second small arm 65, an upper end of the second small arm adjusting cylinder 66 is connected with the second large arm 63 through a hinge, and a lower end of the second small arm adjusting cylinder 66 is connected with the second wrist motor 67 through a hinge; and the second end effector 68 is located at a bottommost end of the second working arm 6, and a top of the second end effector 68 is fixedly connected with an output flange of the second wrist motor 67. The second end effector 68 comprises a second U-shaped seat 681, a second wrist swinging motor 682, a second belt driving device 683, a second fork bracket 684, a plasma cutter 685, and a pneumatic gripper 686, wherein a top of the second U-shaped seat 681 is fixedly connected with the output flange of the second wrist motor 67, and the second wrist swinging motor 682 is fixedly mounted on the second U-shaped seat 681 through screws; the second fork bracket 684 is mounted at a bottom of the second U-shaped seat 681 and is connected with the second U-shaped seat 681 through a hinge; the second belt driving device 683 is mounted in the second U-shaped seat 681, and the second wrist swinging motor 682 is connected with the second fork bracket 684 through the second belt driving device 683; and the plasma cutter 685 is fixedly mounted on one side of the second fork bracket 684 through screws, and the pneumatic gripper 686 is fixedly mounted on the other side of the second fork bracket 684.

As illustrated in FIG. 1, FIG. 2, FIG. 7, and FIG. 8, the first shoulder motor 51, the second shoulder motor 61, the first wrist motor 57, the second wrist motor 67, the first wrist swinging motor 582, and the second wrist swinging motor 682 each are a servo reducing motor. The first shoulder motor 51 is fixedly mounted on the annular seat body 41 through screws, the second shoulder motor 61 is fixedly mounted on the first sliding block body 421 of the first sliding block 42 through screws, the third shoulder motor 71 on the third working arm 7 is fixedly mounted on the second sliding block body 431 of the second sliding block 43 through screws, and the fourth shoulder motor 81 on the fourth working arm 8 is fixedly mounted on the third sliding block body 441 of the third sliding block 44 through screws. Axes of the first shoulder motor 51 and the first wrist motor 57 both are perpendicular to an axis of the first wrist swinging motor 582, and axes of the second shoulder motor 61 and the second wrist motor 67 both are perpendicular to an axis of the second wrist swinging motor 682. The first belt driving device 583 and the second belt driving device 683 both are a synchronous toothed belt driving device. By replacing the pneumatic air picks and the plasma cutters on the end effectors of the first working arm 5, the second working arm 6, the third working arm 7, and the fourth working arm 8 with tools such as polishing grinders and repair welding guns, operation tasks such as casting cleaning and grinding, polishing and repair welding can be executed. The first large arm adjusting cylinder 54, the first small arm adjusting cylinder 56, the second large arm adjusting cylinder 64, and the second small arm adjusting cylinder 66 adopt servo hydraulic cylinders. Included angles between supports on two sides of the first fork bracket 584 and the second fork bracket 684 each are 90°.

During use, the driving motor 131 in the driving wheel 13 is started according to the working need, so as to drive the traveling device 1 to move and travel on the annular guide rail 9 to a designated operation position, then the rotating device 2 and the lifting device 3 are respectively adjusted according to operation posture and height demands, and the four working arms of the present invention are adjusted to suitable rotating angles and operation heights. Then, the number of the magnetic cranes and the number of the pneumatic grippers needed for handling the casting is determined and selected according the weight and size of the casting. The first sliding motor 423, the second sliding motor 433, and the third sliding motor 443 may also be started according to the shape and the size of the casting, so as to adjust the positions of the first shoulder motor 51, the second shoulder motor 61, the third shoulder motor 71, and the fourth shoulder motor 81 on the annular seat body 41. Posture adjustment of the end effector on each working arm may be realized through the servo reducing motor, the large arm adjusting cylinder, and the small arm adjusting cylinder mounted on each working arm. When a cleaning task is executed, firstly the first wrist motor 57, the second wrist motor 67, the third wrist motor on the third working arm, and the fourth wrist motor on the fourth working arm need to be started to adjust the pneumatic air picks, the plasma cutters or replaced tools such as polishing grinders and repair welding guns to suitable working angles, and then the cleaning operation is performed. The four working arms may also jointly operate, the two pneumatic grippers, the two magnetic cranes, and the four cleaning tools may be flexibly transformed, multi-tool synchronous operation can also be realized, the demands of cleaning operations such as handling, sand cleaning, cutting, polishing and grinding of heavy-weight, large-size, and complexly-shaped castings can be satisfied, the efficiency and quality of casting cleaning operations can also be improved, and the labor intensity of operators and the production cost can be reduced.

In the description of the present invention, it needs to be understood that orientation and position relationships indicated by terms "above", "below", "horizontal", "top", "bottom", "inner", "outer" and the like are orientation or position relationships based on the drawings and are only used for facilitating the description of the present invention and the simplification of the description, instead of indicating or implying that the designated devices or elements must have specific orientations or must be constructed and operated at specific orientations, and thus shall not be understood as limitations to the present invention.

The basic principle, major features, and advantages of the present invention are shown and described above. One skilled in the art shall understand that the present invention is not limited by the above-mentioned embodiments, what are described in the above-mentioned embodiments and description are just used for describing the principle of the present invention. The present invention may have various variations and improvements without departing from the spirit and scope of the present invention, and these variations and improvements shall be all included in the protective scope of the present invention. The protective scope of the present invention is defined by the attached claims and equivalents thereof.

The invention claimed is:

1. A multi-arm hanging rail casting cleaning robot, comprising a traveling part, an adjustment part, and a multi-arm effecting part, wherein the traveling part comprises a traveling device and an annular rail, and the annular rail comprises an outer annular rail and an inner annular rail; the traveling device comprises outer wheel carriers, inner wheel carriers, driving wheels, supporting wheels, tensioning wheels, and hanging brackets, a number of the outer wheel carriers is two, the two outer wheel carriers are disposed in parallel on the outer annular rail, the two outer wheel carriers are connected with the outer annular rail through the driving wheels, the supporting wheels, and the tensioning wheels, and a number of the driving wheels, a number of the supporting wheels, and a number of the tensioning wheels mounted on each outer wheel carrier is one; two inner wheel carriers are disposed in parallel on the inner annular rail and are connected with the inner annular rail through the supporting wheels and the tensioning wheels, and two supporting wheels and one tensioning wheel are mounted on each inner wheel carrier; an outer diameter and a wheel width of the driving wheels are respectively the same as an outer diameter and a wheel width of the supporting wheels, axes of the driving wheels and the supporting wheels are located on same horizontal plane, the driving wheels and the supporting wheels mounted on the outer wheel carriers are located at middle-upper portions of the outer wheel carriers, two groups of supporting wheels mounted on the inner wheel carriers are located at middle-upper portions of the inner wheel carriers, the tensioning wheels mounted on the outer wheel carriers are located at middle positions of bottoms of the outer wheel carriers, and the tensioning wheels mounted on the inner wheel carriers are located at middle positions of bottoms of the inner wheel carriers; tops of two hanging brackets are respectively connected with the outer wheel carriers and the inner wheel carriers through first hinges; straight line segments of the outer annular rail and the inner annular rail are kept, respectively, to be parallel and equidistant relative to one another and arc line segments of the outer annular rail and the inner annular rail are kept, respectively, to be concentric and equidistant relative to one another, and the outer annular rail and the inner annular rail are fixedly connected together through connecting plates; the outer annular rail and the inner annular rail are configured to be fixedly mounted to a supporting structure to be operably supported above a ground surface; and cross sections of the outer annular rail and the inner annular rail are I-shaped;

the adjustment part comprises a rotating device and a lifting device, wherein the rotating device comprises a rotating cylinder, a rotating body, a rotating motor, a driving gear, and an inner gear ring, a top of the rotating cylinder is fixedly mounted at a bottom of the hanging bracket of the traveling device, and a limiting check ring is provided at a bottom of the rotating cylinder; the rotating body is sleeved in the rotating cylinder and is connected with the rotating cylinder through two thrust bearings and one radial bearing; the rotating motor is fixedly mounted on the rotating cylinder, the driving gear is mounted on an output shaft of the rotating motor, and a shaft end check ring is further provided at a tail end of the output shaft of the rotating motor and is fixedly connected with the output shaft of the rotating motor; the inner gear ring is fixedly mounted in the rotating body through first screws and is internally engaged with the driving gear; and the rotating motor is a servo reducing motor;

the lifting device comprises a lifting seat, telescopic sleeves, and electric pushrods, the lifting seat is located below the rotating body and is connected with the rotating body through second screws, a number of the telescopic sleeves is two, and the two telescopic sleeves are symmetrically disposed below the lifting seat and are connected with the lifting seat through third screws; a number of the electric pushrods is two, wherein the two electric pushrods are symmetrically disposed below the lifting seat and are connected with the lifting seat through second hinges;

the multi-arm effecting part comprises a working arm mounting seat, a first working arm, a second working arm, a third working arm, and a fourth working arm, wherein the working arm mounting seat is located below the lifting device and is connected with lower ends of the telescopic sleeves and the electric pushrods respectively through fourth screws and third hinges; the first working arm, the second working arm, the third working arm, and the fourth working arm each are a five-degree-of-freedom articulated series manipulator, upper ends of the first working arm, the second working arm, the third working arm, and the fourth working arm all are mounted on the working arm mounting seat, the first working arm and the fourth working arm are fully the same in structure and are symmetrically disposed below the working arm mounting seat, and the second working arm and the third working arm are fully the same in structure and are symmetrically disposed below the working arm mounting seat; and a top of the first working arm is fixedly connected with the working arm mounting seat, and tops of the second working arm, the third working arm, and the fourth working arm are capable of sliding along the working arm mounting seat.

2. The multi-arm hanging rail casting cleaning robot according to claim 1, wherein the first working arm comprises a first shoulder motor, a first shoulder seat, a first large arm, a first large arm adjusting cylinder, a first small arm, a first small arm adjusting cylinder, a first wrist motor, and a first end effector, wherein the first shoulder motor is fixedly mounted on the working arm mounting seat, and a first motor mounting seat is provided at a lower end of the first shoulder motor; the first shoulder seat is located below the working arm mounting seat and is connected with an output flange of the first shoulder motor; an upper end of the first large arm is connected with the first shoulder seat through a fifth hinge, and a lower end of the first large arm is connected with an upper end of the first small arm through a sixth hinge; an upper end of the first large arm adjusting cylinder is connected with the first shoulder seat through a seventh hinge, and a lower end of the first large arm adjusting cylinder is connected with a middle-lower portion of the first large arm through a eighth hinge; an upper end of the first wrist motor is fixedly connected with a lower end of the first small arm, an upper end of the first small arm adjusting cylinder is connected with the first large arm through a ninth hinge, and a lower end of the first small arm adjusting cylinder is connected with the first wrist motor through a tenth hinge; the first end effector is located at a terminal end of the first working arm, and a top of the first end effector is fixedly connected with an output flange of the first wrist motor; the first end effector comprises a first U-shaped seat, a first wrist swinging motor, a first belt driving device, a first fork bracket, a pneumatic air pick, and a magnetic crane, a top of the first U-shaped seat is fixedly connected with the output flange of the first wrist motor, wherein the first wrist swinging motor is mounted on the first U-shaped seat; the first fork bracket is mounted at a bottom of the first U-shaped seat and is connected with the first U-shaped seat through a eleventh hinge; the first belt driving device is mounted in the first U-shaped seat, and the first wrist swinging motor is connected with the first fork bracket through the first belt driving device; the pneumatic air pick is fixedly mounted on a first side of the first fork bracket, and the magnetic crane is fixedly mounted on the other a second side of the first fork bracket;

the magnetic crane comprises a magnetic crane seat and electromagnetic suction heads, and the magnetic crane seat is fixedly mounted on a support on one side of the first fork bracket through fifth screws; the number of the electromagnetic suction heads is three, wherein the three electromagnetic suction heads are triangularly disposed on the magnetic crane seat and all are connected with the magnetic crane seat through spherical hinges; and electromagnets are provided in the electromagnetic suction heads;

the second working arm comprises a second shoulder motor, a second shoulder seat, a second large arm, a second large arm adjusting cylinder, a second small arm, a second small arm adjusting cylinder, a second wrist motor, and a second end effector, wherein the second shoulder motor is fixedly mounted on the working arm mounting seat, and a second motor mounting seat is provided at a lower end of the second shoulder motor; the second shoulder seat is located below the working arm mounting seat and is connected with an output flange of the second shoulder motor; an upper end of the second large arm is connected with the second shoulder seat through a twelfth hinge, and a lower end of the second large arm is connected with an upper end of the second small arm through a thirteenth hinge; an upper end of the second large arm adjusting cylinder is connected with the second shoulder seat through a fourteenth hinge, and a lower end of the second large arm adjusting cylinder is connected with a middle-lower portion of the second large arm through a fifteenth hinge; an upper end of the second wrist motor is fixedly connected with a lower end of the second small arm, an upper end of the second small arm adjusting cylinder is connected with the second large arm through a sixteenth hinge, and a lower end of the second small arm adjusting cylinder is connected with the second wrist motor through a seventeenth hinge; the second end effector is located at a terminal end of the second working arm, and a top of the second end effector is fixedly connected with an output flange of the second wrist motor; wherein the second end effector comprises a second U-shaped seat, a second wrist swinging motor, a second belt driving device, a second fork bracket, a plasma cutter, and a pneumatic gripper, a top of the second U-shaped seat is fixedly connected with the output flange of the second wrist motor, wherein the second wrist swinging motor is mounted on the second U-shaped seat; the second fork bracket is mounted at a bottom of the second U-shaped seat and is connected with the second U-shaped seat through a eighteenth hinge; the second belt driving device is mounted in the second U-shaped seat, and the second wrist swinging motor is connected with the second fork bracket through the second belt driving device; the pneumatic air pick is fixedly mounted on one side of the second fork bracket, and the pneumatic gripper is fixedly mounted on the other side of the second fork bracket;

the working arm mounting seat comprises an annular seat body, a first sliding block, a second sliding block, a third sliding block, and a sliding gear ring, wherein a top of the annular seat body is connected with the lower ends of the telescopic sleeves and the electric pushrods respectively through sixth screws and fourth hinges, and the top of the first working arm is fixedly mounted on the annular seat body; the first sliding block, the second sliding block, and the third sliding block are sleeved on the annular seat body and are connected with the annular seat body through a top thrust bearing, an outer side radial bearing, and an inner side thrust bearing; the sliding gear ring is mounted on an inner side surface of the annular seat body and is fixedly connected with the annular seat body; the first sliding block comprises a first sliding block body, a first driving gear, and a first sliding motor, and the first sliding motor is fixedly mounted on the first sliding block body; the first driving gear is fixedly mounted on an output shaft of the first sliding motor and is internally engaged with the sliding gear ring; the second sliding block comprises a second sliding block body, a second driving gear, and a second sliding motor, and the second sliding motor is fixedly mounted on the second sliding block body; the second driving gear is fixedly mounted on an output shaft of the second sliding motor and is internally engaged with the sliding gear ring; the third sliding block comprises a third sliding block body, a third driving gear, and a third sliding motor, wherein the third sliding motor is fixedly mounted on the third sliding block body; the third driving gear is fixedly mounted on an output shaft of the third sliding motor and is internally engaged with the sliding gear ring; the first sliding block body, the second sliding block body, and the third sliding block body are sleeved on the annular seat body, and are connected with the annular seat body through the top thrust bearing, the outer side radial bearing, and the inner side thrust bearing; wherein the first shoulder motor, the second shoulder motor, the first wrist motor, the second wrist motor, the first wrist swinging motor, and the second wrist swinging motor each are a servo reducing motor.

3. The multi-arm hanging rail casting cleaning robot according to claim 1, wherein the tensioning wheel comprises a tensioning wheel carrier, a tensioning wheel body, guide shafts, compression springs, and anti-separation blocks, wherein the tensioning wheel body is mounted at a top of the tensioning wheel carrier, and two ends of a rotating shaft of the tensioning wheel body are connected with the tensioning wheel carrier by means of transition fitting; tops of the guide shafts are fixedly connected with the tensioning wheel carrier, lower ends of the guide shafts are mounted on the outer wheel carrier or the inner wheel carrier and are connected with the outer wheel carrier or the inner wheel carrier by means of clearance fitting; the compression springs are sleeved on the guide shafts and are located between the tensioning wheel carrier and the outer wheel carrier or the inner wheel carrier; and the anti-separation blocks are located at the lower ends of the guide shafts and are fixedly connected with the guide shafts.

4. The multi-arm hanging rail casting cleaning robot according to claim 1, wherein a driving motor is provided in the driving wheel, and the driving motor is a hydraulic servo motor, a pneumatic servo motor or a servo reducing motor.

5. The multi-arm hanging rail casting cleaning robot according to claim 1, wherein the thrust bearings are cylindrical roller thrust bearings, and the radial bearing is a cylindrical roller radial bearing.

6. The multi-arm hanging rail casting cleaning robot according to claim 2, wherein the first shoulder motor is fixedly mounted on the annular seat body, the second shoulder motor is fixedly mounted on the first sliding block body, the third shoulder motor on the third working arm is fixedly mounted on the second sliding block body, and the fourth shoulder motor on the fourth working arm is fixedly mounted on the third sliding block body; axes of the first shoulder motor and the first wrist motor both are perpendicular to an axis of the first wrist swinging motor, and axes of the second shoulder motor and the second wrist motor both are perpendicular to an axis of the second wrist swinging motor.

7. The multi-arm hanging rail casting cleaning robot according to claim 1, wherein two symmetrically disposed industrial cameras are provided below the working arm mounting seat, and the industrial cameras are fixedly mounted below the working arm mounting seat through two-degree-of-freedom holders.

8. The multi-arm hanging rail casting cleaning robot according to claim 1, wherein the first large arm adjusting cylinder, the first small arm adjusting cylinder, the second large arm adjusting cylinder, wherein the second small arm adjusting cylinder is a servo hydraulic cylinder or a servo cylinder or a servo electric cylinder.

9. The multi-arm hanging rail casting cleaning robot according to claim 1, wherein tops of the two hanging brackets are in parallel with axes of the first hinges, wherein the first hinges are connected with the outer wheel carriers and the inner wheel carriers, and the tops of the two hanging brackets are perpendicular to a horizontal plane.

10. The multi-arm hanging rail casting cleaning robot according to claim 2, wherein ranges of included angles between supports on two sides of the first fork bracket and the second fork bracket each are 60°-100°.

* * * * *